(12) United States Patent
Dölger et al.

(10) Patent No.: US 10,167,835 B2
(45) Date of Patent: Jan. 1, 2019

(54) HYDROSTATIC DRIVE SYSTEM

(71) Applicant: Linde Hydraulics GmbH & Co. KG, Aschaffenburg (DE)

(72) Inventors: Marcus Dölger, Haibach (DE); Lukas Krittian, Aschaffenburg (DE)

(73) Assignee: Linde Hydraulics GmbH & Co. KG., Aschaffenburg (DE)

( * ) Notice: Subject to any disclaimer, the term of this patent is extended or adjusted under 35 U.S.C. 154(b) by 232 days.

(21) Appl. No.: 15/157,757

(22) Filed: May 18, 2016

(65) Prior Publication Data

US 2016/0341168 A1 Nov. 24, 2016

(30) Foreign Application Priority Data

May 19, 2015 (DE) .......................... 10 2015 107 857

(51) Int. Cl.
*F02N 7/08* (2006.01)
*F02N 7/06* (2006.01)
(Continued)

(52) U.S. Cl.
CPC .............. *F02N 7/06* (2013.01); *E02F 9/2217* (2013.01); *E02F 9/2246* (2013.01); *E02F 9/2292* (2013.01); *E02F 9/2296* (2013.01); *F02B 63/06* (2013.01); *F02N 7/00* (2013.01); *F02N 7/08* (2013.01); *F02N 11/0814* (2013.01); *F04B 13/00* (2013.01); *F04B 17/05* (2013.01); *F15B 1/027* (2013.01); *B60K 2006/126* (2013.01); *F15B 2211/20523* (2013.01);
(Continued)

(58) Field of Classification Search
CPC ....... F02N 7/06; F02N 7/08; B60K 2006/125; B60K 2006/126; F15B 2211/50572; F15B 2211/781
See application file for complete search history.

(56) References Cited

U.S. PATENT DOCUMENTS 4,573,319 A * 3/1986 Chichester ............... B62D 5/07
60/422
4,845,947 A * 7/1989 Persson ................... F15B 11/16
60/427
(Continued)

FOREIGN PATENT DOCUMENTS

DE 4320655 A1 1/1995
DE 10211104919 A1 10/2012
(Continued)

*Primary Examiner* — F. Daniel Lopez
(74) *Attorney, Agent, or Firm* — The Webb Law Firm

(57) ABSTRACT

A hydrostatic drive system of a mobile machine includes a hydraulic work system and a hydraulic work pump that is driven by an internal combustion engine and, when operated as a pump, takes in hydraulic fluid with a suction side from a tank and, with a delivery side, delivers into a delivery line that leads to the hydraulic work system. A bypass valve is provided with which, when the hydraulic work pump is operated as a motor to start the shut-off internal combustion engine, the volume flow delivered by the hydraulic work pump operated as a motor to the delivery side is diverted to the tank. The bypass valve, in the motor operation to start the shut-off internal combustion engine, is actuated into an open position that connects the delivery side of the hydraulic work pump with the tank.

10 Claims, 4 Drawing Sheets

(51) Int. Cl.
*F02N 7/00* (2006.01)
*F02N 11/08* (2006.01)
*F02B 63/06* (2006.01)
*F04B 13/00* (2006.01)
*F04B 17/05* (2006.01)
*F15B 1/027* (2006.01)
*E02F 9/22* (2006.01)
*B60K 6/12* (2006.01)

(52) U.S. Cl.
CPC ........... *F15B 2211/20569* (2013.01); *F15B 2211/212* (2013.01); *F15B 2211/4053* (2013.01); *F15B 2211/41509* (2013.01); *F15B 2211/50518* (2013.01); *F15B 2211/50536* (2013.01); *F15B 2211/50563* (2013.01); *F15B 2211/5151* (2013.01); *F15B 2211/6651* (2013.01); *F15B 2211/7142* (2013.01); *F15B 2211/781* (2013.01); *Y02T 10/48* (2013.01)

(56) References Cited

U.S. PATENT DOCUMENTS

| | | | |
|---|---|---|---|
| 2006/0108860 A1* | 5/2006 | Stragier | B60K 6/12 303/15 |
| 2014/0165947 A1 | 6/2014 | Krittian et al. | |
| 2015/0052889 A1 | 2/2015 | Krittian et al. | |

FOREIGN PATENT DOCUMENTS

| | | |
|---|---|---|
| DE | 102012108857 A1 | 3/2014 |
| DE | 102013110239 A1 | 2/2015 |
| JP | 201391953 A | 5/2013 |
| SU | 1263899 A1 | 10/1986 |

* cited by examiner

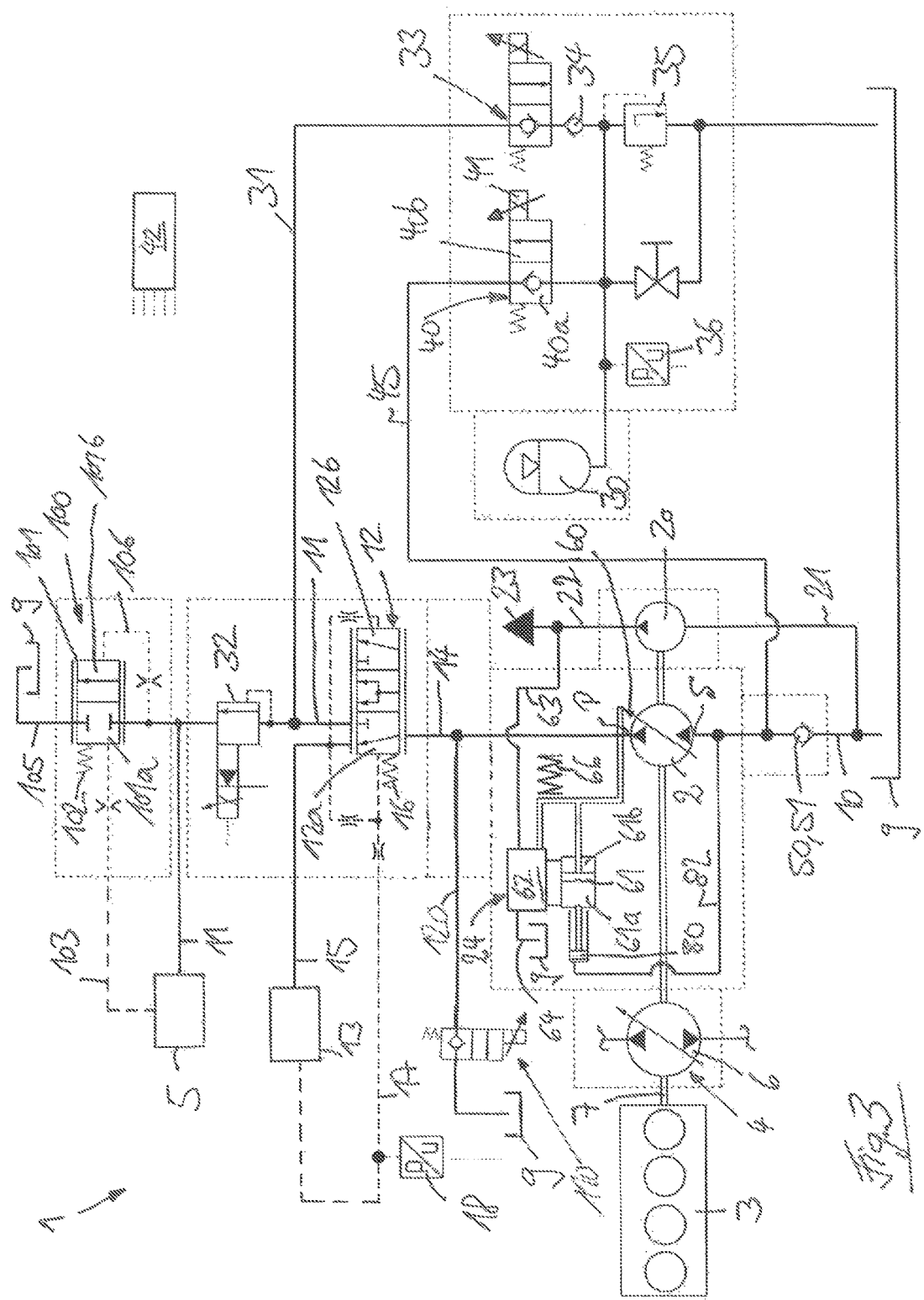

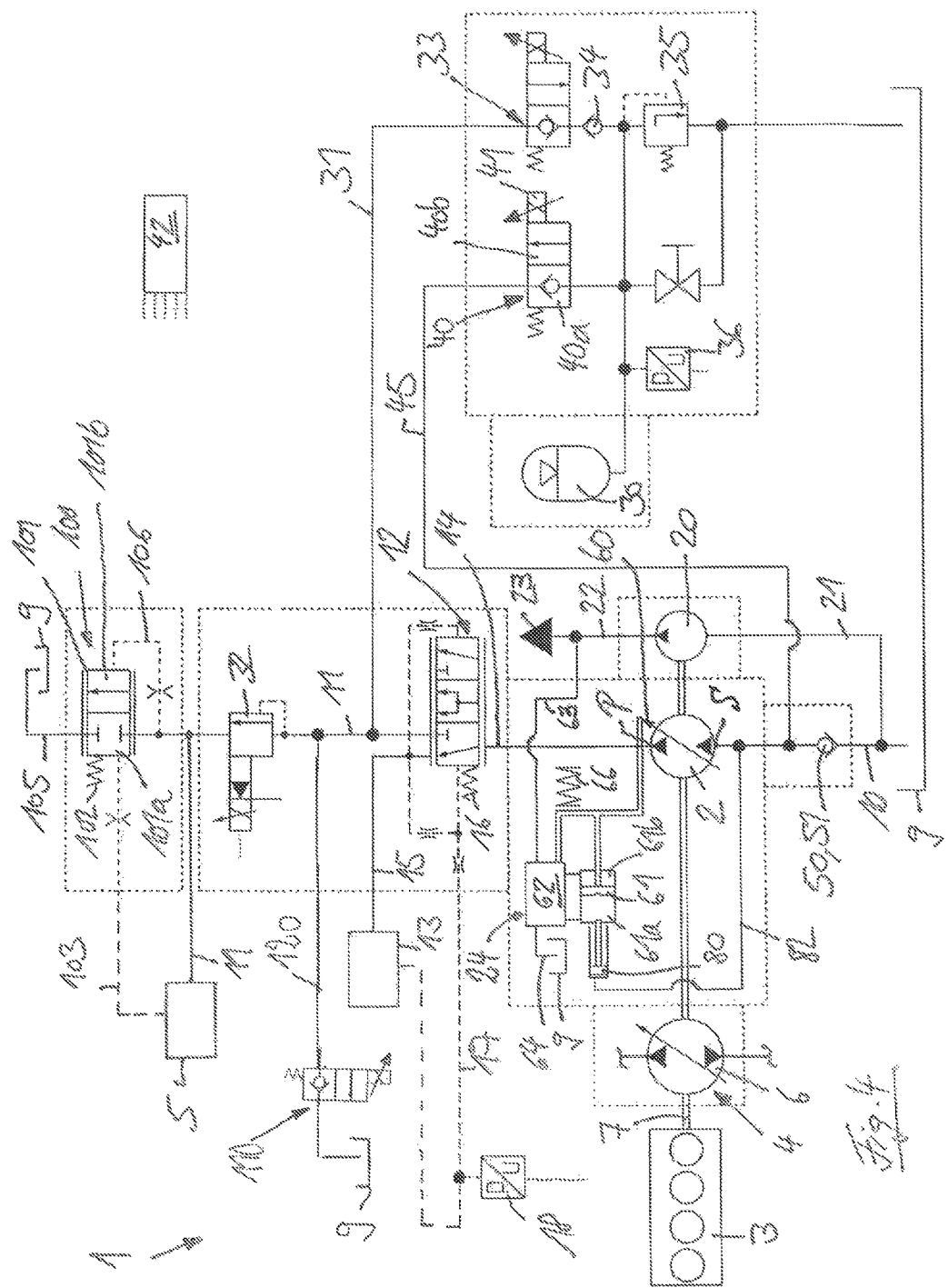

HYDROSTATIC DRIVE SYSTEM

CROSS REFERENCE TO RELATED APPLICATION

This application claims priority to German Application DE 102015107857.0, filed May 19, 2015, which is herein incorporated by reference in its entirety.

BACKGROUND OF THE INVENTION

Field of the Invention

This invention relates to a hydrostatic drive system of a mobile machine with a hydraulic work system and a hydraulic work pump driven by an internal combustion engine, wherein the hydraulic work pump, when operating as a pump, takes in hydraulic fluid, with a suction side, from a tank and, with a delivery side, delivers into a delivery line that leads to the hydraulic work system, wherein a hydraulic start-stop function is provided to start the shut-off internal combustion engine, in which the hydraulic work pump can be operated as a motor, wherein in operation as a motor, the hydraulic work pump is driven by hydraulic fluid that is delivered from a hydraulic accumulator to the suction side of the hydraulic work pump.

Description of Related Art

Hydrostatic drive systems of this type are used in mobile machines such as construction equipment, industrial trucks, agricultural equipment, forestry equipment, excavators, wheeled and telescoping loaders, tractors, combine harvesters, forage harvesters and sugar beet or potato diggers.

To reduce fuel consumption when the internal combustion engine is running at idle, for example during waiting periods, pauses in work or interruptions in work, during which a work function of the hydraulic work system and/or a traction function of a traction drive is not required, a start-stop function for the internal combustion engine is provided in which the internal combustion engine operating at no load is shut off during waiting periods, pauses in work, or during interruptions in work and is therefore shut off, and is automatically restarted if a torque request is received from a work function and/or by the traction drive. With a hydraulic start-stop function of the internal combustion engine, which has a hydraulic starter to start the shut-off internal combustion engine, a start-stop function can be achieved in a rugged and reliable fashion.

To eliminate the construction expense for a separate hydraulic starter with the start-stop function for the shut-off internal combustion engine, it is already known that the existing hydraulic work pump can also be operated as a motor which, when operated as a motor, forms the hydraulic starter of the start-stop function to start the shut-off internal combustion engine. When operated as a pump, the hydraulic work pump is driven by the running internal combustion engine and, with a suction side, sucks hydraulic fluid out of a tank. When operated as a pump, the hydraulic work pump delivers hydraulic fluid to the delivery side to supply a consumer of the hydraulic work system. When operated as a motor, the hydraulic work pump is supplied with hydraulic fluid under pressure on the suction side from a hydraulic accumulator previously charged with hydraulic fluid, and the hydraulic work pump is driven by the hydraulic fluid supplied from the hydraulic accumulator. Therefore, when operated as a motor, the hydraulic work pump generates an additional torque on the crankshaft of the internal combustion engine which is used to start the shut off internal combustion engine.

A drive system of the prior art in which the hydraulic work pump, operating as a motor, is driven on the suction side by hydraulic fluid from a hydraulic accumulator to start a shut-off internal combustion engine is known from DE 10 2013 110 239 A1.

During the starting process of the internal combustion engine, it is necessary to divert the flow of hydraulic fluid, which is supplied to the suction side from the hydraulic accumulator when the hydraulic work pump is being operated as a motor, on the delivery side of the hydraulic work pump into a tank. For this purpose, a tank discharge path of the hydraulic work system can be used, which is formed by a circulation pressure compensator of the hydraulic work system. The circulation pressure compensator is actuated toward a closed position by a spring and the maximum load pressure of the user of the hydraulic work system, and is actuated into an open position, in which the tank discharge path is opened and the delivery line of the hydraulic work system is in communication with a tank by the pressure of the hydraulic work pump present in the delivery line of the hydraulic work system.

Since the circulation pressure compensator is in the closed position when the internal combustion engine is shut off, it must be actuated into the open position against the force of the spring at the beginning of the starting process of the shut-off internal combustion engine by the hydraulic fluid pressure flowing out of the delivery side of the hydraulic work pump that is being operated as a motor to open the tank discharge path. The pressure increase on the delivery side of the hydraulic work pump operated as a motor, which is used to open the circulation pressure compensator, reduces the pressure difference between the suction side and the delivery side of the hydraulic work pump operated as a motor, so that when the hydraulic work pump is operated as a motor, the torque that can be delivered, which is a function of the pressure present in the hydraulic accumulator, to start the internal combustion engine, is reduced. This torque is further reduced when, at the beginning of the starting process, by the hydraulic fluid that flows out of the delivery side of the hydraulic work pump operated as a motor, additional valves located upstream of the circulation pressure compensator, which are in the closed position that shuts off the delivery line of the hydraulic work system when the internal combustion engine is shut off, must be opened. The additional valves may include a priority valve for the priority supply of a user and/or a charging valve to charge the hydraulic accumulator or a retarder valve with which the delivery line of the hydraulic work system can be throttled when the machine is in a braking operation.

The object of this invention is to make available a drive system of the type described above, with which, with little additional construction expense or effort, the torque to start the shut-off internal combustion engine can be increased by operating the hydraulic work pump as a motor.

SUMMARY OF THE INVENTION

The invention accomplishes this object by providing a bypass valve with which, when the hydraulic work pump is operating as a motor to start the shut-off internal combustion engine, the volume flow from the hydraulic work pump operated as a motor supplied to the delivery side can be diverted to the tank. In operation as a motor, to start the shut-off internal combustion engine, the bypass valve is actuated into an open position that connects the delivery side of the hydraulic work pump with the tank. According to the invention, therefore, a bypass valve is provided with which, when the hydraulic work pump is operated as a motor during the starting process of the shut-off internal combustion engine, the delivery side of the hydraulic work pump is in direct communication with the tank so that the volume flow delivered to the delivery side is diverted directly to the tank. In the drive system according to the invention, during the starting process of the shut-off internal combustion engine, the volume flow supplied to the delivery side during operation of the hydraulic work pump as a motor is not diverted via the tank discharge path of the hydraulic work system to the tank, but is diverted via the open bypass valve directly to the tank, so that the tank discharge path of the hydraulic work system and the valves located in the tank discharge path are bypassed. In the drive system according to the invention in which, during the starting process of the internal combustion engine, the tank discharge path of the hydraulic work system is bypassed and the flow of hydraulic fluid from the hydraulic work pump operated as a motor delivered to the delivery side is diverted by means of the bypass valve to the tank, it is not necessary to open the valves located in the tank discharge path of the hydraulic work system. As a result of the direct communication of the delivery side of the hydraulic work pump with the tank via the bypass valve during the starting process of the shut off internal combustion engine, the pressure counteracting the buildup of torque on the delivery side of the hydraulic work pump operated as a motor can therefore be reduced, so that an increased torque is made available by the hydraulic work pump operated as a motor to start the internal combustion engine. The increased torque that is output by the hydraulic work pump operated as a motor in the drive system according to the invention makes it possible to start large-volume internal combustion engines or, alternatively, to increase the dynamic response of the starting process of the internal combustion engine.

In one advantageous embodiment of the invention, during the starting process of the internal combustion engine, the bypass valve is actuated into a shut-off position in which the delivery side of the hydraulic work pump to the tank is shut off before the idle speed of the internal combustion engine is reached. The bypass valve is therefore in the open position at the beginning of the starting process of the internal combustion engine to provide a high torque by operating the hydraulic work pump as a motor. If the bypass valve is actuated into a shut-off position, the tank discharge path of the hydraulic work system takes over the hydraulic fluid flow to the delivery side of the hydraulic work pump operated as a motor and diverts it to the tank. If the bypass valve, during the starting process of the internal combustion engine, is actuated into a shut-off position in which it shuts off the delivery side of the hydraulic work pump with the tank, before the idle speed of the internal combustion engine is reached, it is achieved that when the idle speed is reached and the internal combustion engine is restarted, the hydraulic work pump can be operated as a pump to supply the connected users with hydraulic fluid which is delivered on the delivery side of the hydraulic work pump. In addition, this arrangement prevents losses, because after the restart of the internal combustion engine and its operation at the idle speed, the bypass valve is actuated into the shut-off position so that the hydraulic work pump operating as a pump does not deliver hydraulic fluid into the tank via the open bypass valve, which would cause leaks.

In one advantageous embodiment of the invention, in the delivery line of the hydraulic work pump there is a priority valve for the priority supply of a user, in particular a hydraulic steering system, which is in communication on the input side by a connecting line with the delivery side of the hydraulic work pump and on the output side with the delivery line that leads to the hydraulic work system and a delivery line that leads to the priority user, whereby the bypass valve is associated with the connecting line. As a result of the communication of the bypass valve upstream of the priority valve, a particularly favorable discharge of the hydraulic fluid flow delivered to the delivery side of the hydraulic work pump operating as a motor to the tank becomes possible, in which the priority valve is not flowed through and does not need to be opened, so that low pressure losses occur and the hydraulic work pump operated as a motor delivers a high torque.

In one alternative and advantageous embodiment of the invention, in the delivery line of the hydraulic work pump there is a priority valve for the priority supply of a user, in particular a hydraulic steering system, which is in communication on the input side by the connecting line with the delivery side of the hydraulic work pump, and on the output side with the delivery line leading to the hydraulic work system and a delivery line that leads to the priority user, whereby the bypass valve is associated with the delivery line leading to the hydraulic work system. There are advantages that result from the communication of the bypass valve downstream of the priority valve because the operation of the preferred user becomes possible as early as during the starting process of the shut-off internal combustion engine. Furthermore, in this arrangement of the bypass valve, safety is increased because the priority function (for example, a preferred supply of a consumer, such as a hydraulic steering system) is not adversely affected by a failure of the bypass valve.

If a charging valve for the charging of the hydraulic accumulator is located in the delivery line that leads to the hydraulic work system, it is particularly advantageous if the bypass valve is associated with the delivery line upstream of the charging valve. As a result of the communication of the bypass valve upstream of the charging valve, a particularly favorable discharge of the hydraulic fluid flow delivered to the delivery side of the hydraulic work pump operating as a motor to the tank becomes possible, in which the charging valve is not flowed through and does not need to be opened, so that low pressure losses occur and the hydraulic work pump operated as a motor delivers a high torque.

If a circulation pressure compensator is associated with the delivery line leading to the hydraulic work system, it is particularly advantageous if the bypass valve is associated with the delivery line upstream of the circulation pressure compensator. As a result of the communication of the bypass valve upstream of the circulation pressure compensator, a particularly effective relief of the hydraulic fluid flow transported by the hydraulic work pump operating as a motor to the delivery side to the tank bypassing the tank discharge path of the hydraulic work system formed by the circulation pressure compensator is achieved. The circulation pressure compensator is not flowed through and does not need to be opened and therefore the tank relief path of the hydraulic work system is not flowed through, so that small pressure losses occur and the hydraulic work pump operated as a motor outputs a high torque.

In one advantageous embodiment of the invention, the bypass valve can be in the form of an on-off valve (switching valve).

This configuration makes it possible to reduce the construction expense and effort if the on-off valve (switching valve) can be actuated electronically and, for actuation, is in an operative connection with an electronic control unit. With an electronic control unit, the on-off valve (switching valve) can easily be actuated into an open position at the beginning of the starting process of the shut-off internal combustion engine, so that the hydraulic fluid flow supplied by the hydraulic work pump operated as a motor to the delivery side can be diverted with low counter pressure to the tank.

In one advantageous embodiment of the invention, the bypass valve is a check valve that closes in the direction of flow to the tank and can be actuated by a spring into an open position that establishes communication between the delivery side of the hydraulic work pump and the tank. This configuration results in a particularly simple, economical and heavy-duty construction of the bypass valve.

The check valve preferably has a valve body which is actuated by the quantity of hydraulic fluid flowing to the check valve into a shut-off position that shuts off the delivery side of the hydraulic work pump with the tank. The bypass valve, which is in the form of a check valve, therefore works according to the nozzle-baffle plate principle. The check valve is held in the open flowthrough position by means of the adjustable and specified spring force of the spring for a predetermined quantity of hydraulic fluid. If the quantity of hydraulic fluid delivered by the hydraulic work pump to the delivery side exceeds this threshold set by the spring, the valve body of the check valve is actuated into the closed position by the quantity of hydraulic fluid delivered. The check valve is therefore controlled hydraulically, as a result of which a simple and economic control of the bypass valve into the closed position can be achieved.

It is particularly advantageous if, as in one preferred embodiment of the invention, the check valve is designed so that, during the starting process of the internal combustion engine, the valve body is actuated into the closed position before the quantity of hydraulic fluid volume delivered to the delivery side by the hydraulic work pump operated as a motor at a specified displacement volume of the hydraulic work pump and the idle speed of the internal combustion is reached. When the idle speed is reached and the internal combustion engine is restarted, the check valve is therefore actuated into the closed position so that the hydraulic work pump can be operated as a pump to supply the connected users with hydraulic fluid that is delivered to the delivery side of the hydraulic work pump and losses are prevented because, after the restart of the internal combustion engine and its operation at idle speed, the check valve is actuated into the closed position, so that the hydraulic work pump operating as a pump does not deliver into the tank via the open bypass valve which is afflicted by losses.

The hydraulic work pump can be a constant displacement pump with a constant displacement volume. Alternatively, the hydraulic work pump can be a variable displacement pump with a variable displacement volume. The specified displacement volume thereby corresponds to the minimum displacement volume. The check valve is therefore actuated into the closed position before the delivery quantity delivered to the delivery side of the hydraulic work pump operated as a motor is reached, with a minimum displacement volume of the hydraulic work pump and the idle speed of the internal combustion engine also being reached. This ensures that, after the restart of the internal combustion engine and an operation of the variable displacement pump at the minimum displacement volume, when no users of the hydraulic work system are actuated, the check valve is actuated into the closed position, so that a loss-afflicted discharge of the delivery quality supplied by the hydraulic work pump operated as a pump is prevented by the closed bypass valve.

BRIEF DESCRIPTION OF THE DRAWINGS

Additional advantages and details of the invention are explained in greater detail below with reference to the exemplary embodiments illustrated in the accompanying schematic figures in which:

FIG. 3 is a schematic diagram of a third embodiment of the invention; and

FIG. 4 is a schematic diagram of a first embodiment of the invention.

DESCRIPTION OF THE INVENTION

Figure 1:
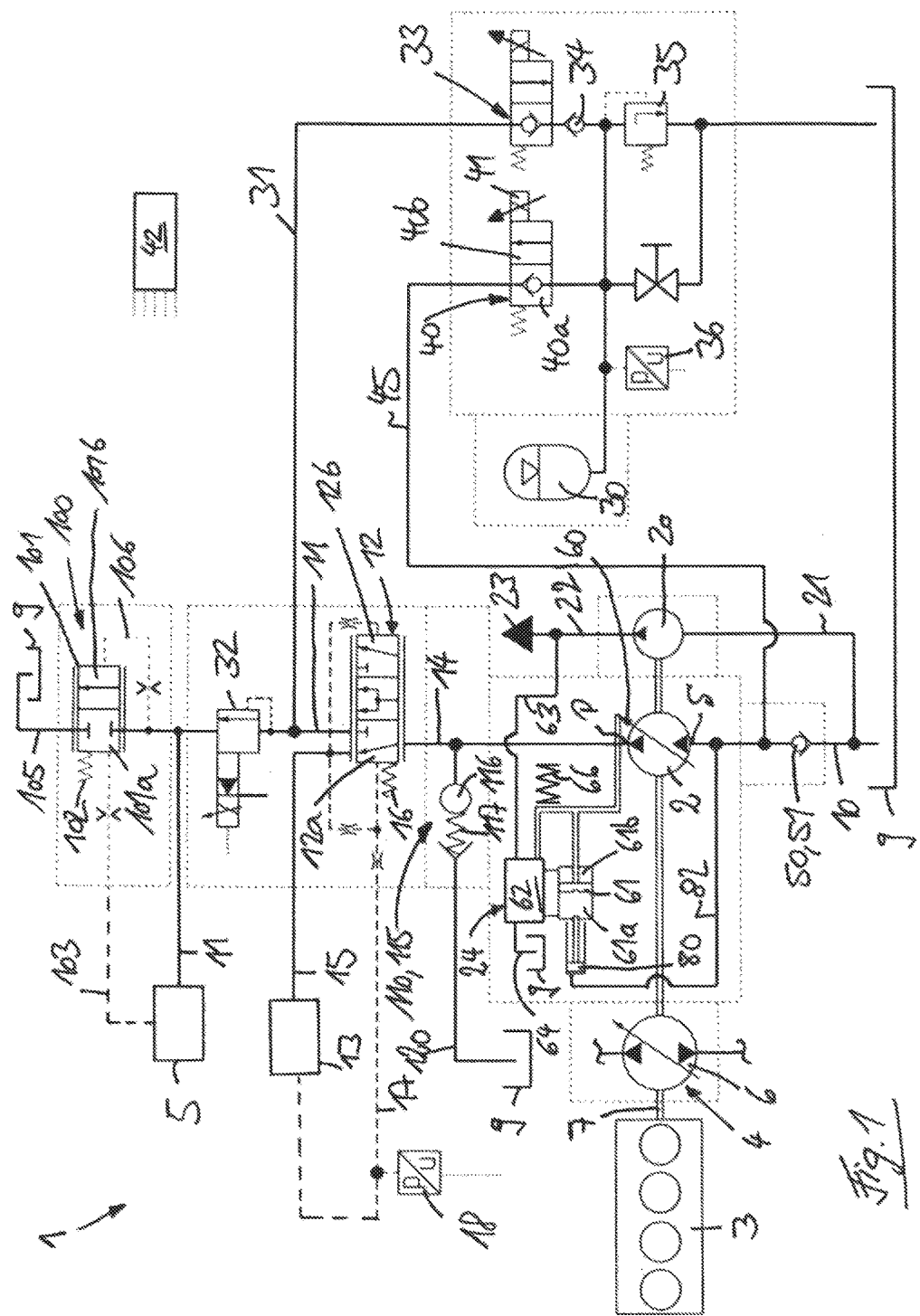
FIG. 1 is a schematic diagram of a first embodiment of the invention.
Figure 2:
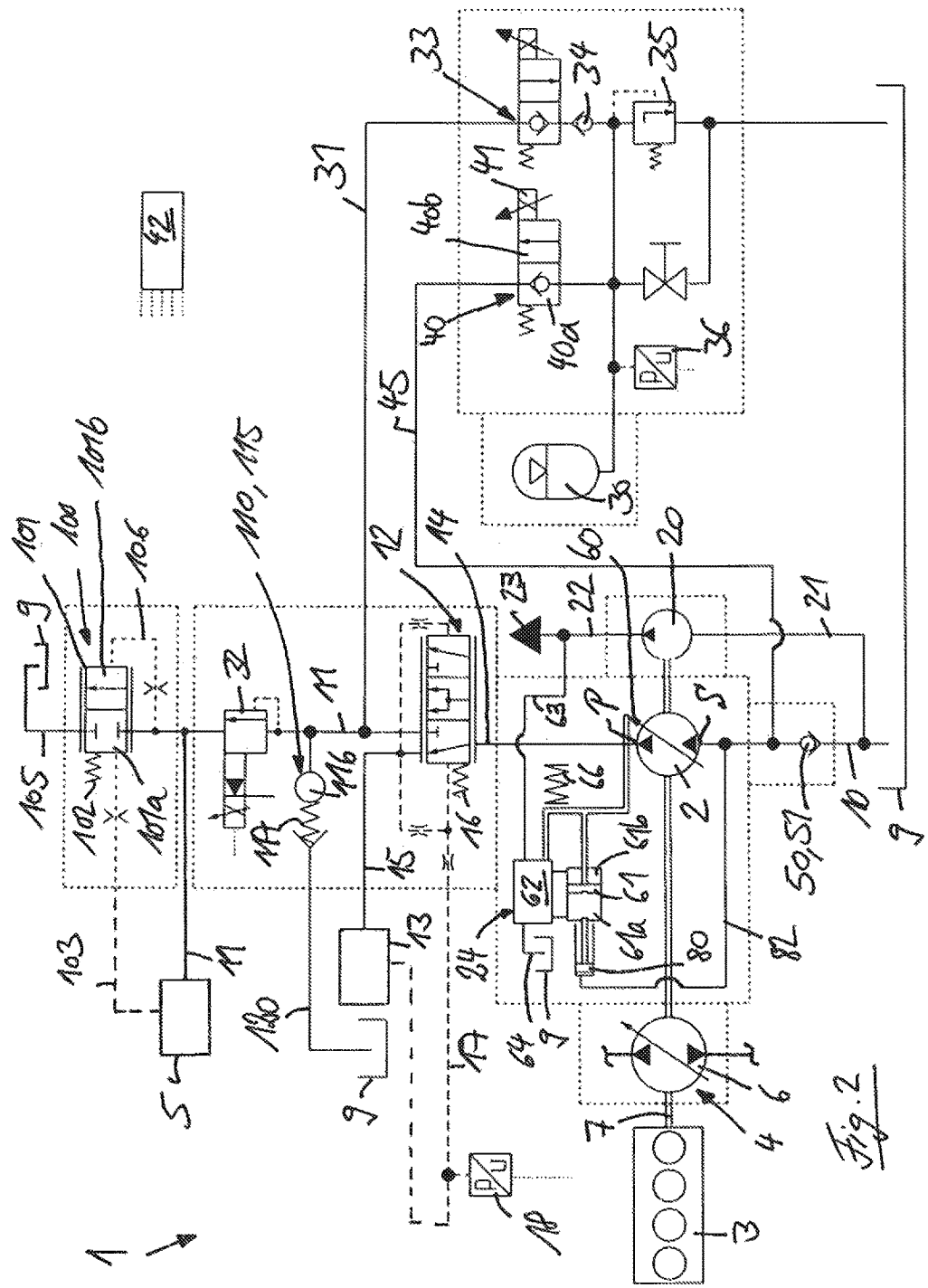
FIG. 2 is a schematic diagram of a second embodiment of the invention.

FIG. 1 and FIG. 2 each present a schematic diagram of a hydrostatic drive system claimed by the invention of a mobile machine not illustrated in any further detail, such as an industrial truck or a mobile machine in the form of a construction or agricultural machine. In the figures, identical components are identified by the same reference numbers.

The drive system 1 includes an internal combustion engine 3, for example a diesel motor, and a hydraulic work pump 2 that is driven by the internal combustion engine 3 and is in a drive connection with the internal combustion engine 3. The hydraulic work pump 2 has a hydraulic work system 5 supplied with hydraulic fluid. In the illustrated exemplary embodiment the drive system 1 additionally includes a traction drive 4 of the machine that is driven by the internal combustion engine 3.

In the illustrated exemplary embodiment, the traction drive 4 is in the form of a hydrostatic traction drive that consists of a variable displacement traction pump 6 which is in connection with a drive shaft 7 of the internal combustion engine 3 to drive the machine. The traction pump 6 is in communication with one or more hydro-motors, which are not illustrated in any further detail, with fixed or variable intake volumes, preferably in a closed circuit, which are in an operative connection with the drive wheels of the vehicle in a manner not illustrated in any further detail.

The traction drive 4 can alternatively be in the form of an electrical traction drive with an electric generator driven by the internal combustion engine 3 and one or more electric traction motors. In addition, the traction drive 4 can be a mechanical traction drive with a mechanical transmission, such as a multispeed transmission, or a power split transmission or a torque converter transmission.

The hydraulic work system 5 includes hydraulic functions and working functions of the machine, such as actuating a load handling means on a lifting mast on an industrial truck hydraulic work system or, on a construction machine in the form of an excavator, for example, the working functions of a working device in the form of a shovel.

To supply the working hydraulic system 5 with hydraulic fluid, in the illustrated example, the hydraulic work pump 2 is in the form of a variable displacement pump with a continuously variable displacement volume which is preferably in the form of an axial piston machine utilizing a bent-axis construction. The hydraulic work pump 2 is operated in an open circuit and, for its drive, is in a drive connection with the drive shaft 7 of the internal combustion engine 3.

The hydraulic work pump 2 is in communication on the input side with a suction side S with a tank 9 by means of a suction line 10. A delivery line 11, which is in communication on the output side with the delivery side P of the hydraulic work pump 2, is in communication with a control valve device not illustrated in any further detail, by means of which the hydraulic users of the hydraulic work system 5, which are not illustrated in any further detail, can be controlled. The control valve device preferably includes one or more directional control valves for the actuation of the users.

In the illustrated exemplary embodiment, a priority valve 12 is also shown with which the preferred supply of a consumer 13 supplied by the hydraulic work pump 2 can be ensured, for example a hydraulic steering device of the vehicle. The priority valve 12 is in communication on the input side by a connecting line 14 with the delivery side P of the hydraulic work pump 2 and is connected on the output side with the delivery line 11 leading to the hydraulic work system 5 and a delivery line 15 that leads to the consumer 13. The priority valve 12 is actuated by a spring 16 and by the load pressure of the consumer 13 present in a load pressure line 17 into a first switch position 12a, in which the connecting line 14 is in communication with the delivery line 15 and the connection of the connecting line 14 with the delivery line 11 is shut off. The priority valve 12 is actuated by the pressure present in the delivery line 15 into a second switched position 12b in which the connecting line 14 is in communication with the delivery line 11 of the hydraulic work system 5 and the connection of the connecting line 14 with the delivery line 15 is shut off. A pressure sensor 18 is provided to measure the pressure present in the load pressure line 17.

The drive system 1 further comprises a charge pump 20 which, has a drive connected with the drive shaft 7. The charge pump 20 in the illustrated exemplary embodiment is a constant displacement pump with a constant displacement volume which is operated in an open circuit. For this purpose, the charge pump 20 is in communication with the suction side by means of a suction line 21 with the tank 9 and delivers into a charge pressure line 22 in communication with a delivery side, to which the corresponding users of a charging pressure circuit 23 are connected, for example a variable displacement device 24 for the variation of the displacement volume of the hydraulic work pump 2. Additional users of the charging pressure circuit 23 can be a charging device of the hydrostatic traction drive, a braking system of the machine and pilot valves for the directional control valves of the hydraulic work system 5.

The hydraulic work pump 2 is in the form of a two-quadrant power unit, which can be operated in the same direction of rotation and same direction of flow of the hydraulic medium as a pump and motor.

In operation as a pump, in which the hydraulic work pump 2 is driven by the running internal combustion engine 3, the hydraulic work pump 2 sucks hydraulic fluid out of the tank 9 via the suction side S and delivers the hydraulic fluid into the delivery side P and thus, via the priority valve 12, into the delivery line 11 of the hydraulic work system 5 or the delivery line 15 of the consumer 13.

When the hydraulic work pump 2 is operated as a motor, the hydraulic work pump 2 operates as a hydraulic starter of a hydraulic start-stop function to start the stopped and shut-off internal combustion engine 3. When operated as a motor, the hydraulic work pump 2 is driven on the suction side S with hydraulic fluid from a hydraulic accumulator 30.

The hydraulic accumulator 30 is in communication with the delivery side P of the hydraulic work pump 2 for charging with hydraulic fluid. In the illustrated exemplary embodiment, for the charging of the hydraulic accumulator 30, the hydraulic accumulator 30 is in communication with the delivery line 11 leading to the hydraulic work system 5 of the hydraulic work pump 2 by means of a connecting line 31.

Located in the delivery line 11 of the hydraulic work system 5 is an electrically actuated charge valve 32, which can be actuated into a throttle position that throttles the delivery line 11 to build up a pressure in the event of an actuation. The charging valve 32 is preferably in the form of a retarder valve that is actuated in braking operation of the machine into a throttle position to impose an additional, braking torque on the drive shaft 7 formed by the crankshaft that counteracts the torque acting as a motor on the traction pump 6 and thereby, brakes the vehicle. In braking operation of this type with a throttling retarder valve, it is also easily possible to recover energy and charge the hydraulic accumulator 30, so that during a braking process the kinetic energy of the vehicle is used to charge the hydraulic accumulator 30. The connecting line 31 is in communication with the delivery line 11 upstream of the charge valve 32 and therefore between the charge valve 32 and the priority valve 12.

To charge the hydraulic accumulator 30, the hydraulic work pump 2 can alternatively be driven on the primary side by the running internal combustion engine 3.

Located in the connecting line 31 is a charge valve device 33 that includes a check valve 34 that opens toward the hydraulic accumulator 30. Also associated with the connecting line 31 between the charge valve device 33 and the hydraulic accumulator 30 is a pressure relief valve 35 to govern the pressure in the hydraulic accumulator 30.

A pressure sensor 36 is also associated with the hydraulic accumulator 30. The pressure sensor 36 monitors the charging pressure and thus the charge status of the hydraulic accumulator 30.

The connection of the hydraulic accumulator 30 with the suction side S of the hydraulic work pump 2 for the operation of the hydraulic work pump 2 as a motor can be controlled by an electrically actuated control valve 40. The control valve 40 has a closed position 40a and an open position 40b, wherein the closed position 40a is preferably leak-tight with a shutoff valve that shuts off the flow to the hydraulic work pump 2. The control valve 40 is an electrically actuated control valve, preferably a switching valve, that can be actuated by means of an electric actuator device 41, for example an actuating magnet, between the closed position 40a and the open position 40b.

The actuator device 41 is in communication for its actuation with an electronic control device 42. The control device 42 is in turn in communication with the pressure sensor 36 and/or the pressure sensor 18. The electronic control device 42 is further in communication with a speed sensor device, not shown in any further detail, that measures the speed of the internal combustion engine 3. The control device 42 can also be in communication with operation control elements of the machine, to transmit a command to start the shut-off internal combustion engine 3 and to trigger the starting process of the shut-off internal combustion engine 3. For this purpose, the control device 42 can be in communication, for example, with a sensor that detects the actuation of an accelerator pedal and/or be in communication with a joystick device, the actuation of which activates the consumers of the hydraulic work system 5 and/or is in communication with a steering angle sensor that detects the actuation of a steering wheel of the steering device. The control device 42 can also activate the charge valve 32 and the charge valve device 33 for the charging operation of the hydraulic accumulator 30.

The control device 42 controls the start-stop function by means of the input signals of the pressure sensor 36, the speed of the internal combustion engine 3, and the signals of the operation control elements (joystick device, sensor on the accelerator pedal or steering angle sensor).

The pressure sensor 18 in the load pressure line 17 of the consumer 13 can also be used as an indicator for a starting process of the shut-off internal combustion engine 3. If, when the internal combustion engine 3 is shut off, an operator of the machine actuates the steering wheel of the steering device, pressure increases in the load pressure line 17, which can be detected by the control device 42, to initiate the starting process to start the shut-off internal combustion engine 3.

The control valve 40 is located in a connecting line 45 that runs from the hydraulic accumulator 30 to the suction line 10 that runs to the suction side S of the hydraulic work pump 2. The connecting line 31 provided with the charge valve device 33 is in communication with the connecting line 45 between the control valve 40 and the hydraulic accumulator 30.

In the suction line 10 of the hydraulic work pump 2, there is a shutoff valve 50 that shuts off the flow toward the tank 9 and is preferably realized in the form of a check valve 51 that shuts off the flow in the direction of the tank 9. The shutoff valve 50, when the hydraulic work pump 2 is operated as a motor, prevents a discharge of the hydraulic fluid flowing from the hydraulic accumulator 30 to the suction side S of the hydraulic work pump 2 into the tank 9 and makes possible a buildup of pressure on the suction side S of the hydraulic work pump 2 for operation as a motor.

The hydraulic work pump 2, with a continuously variable displacement volume to regulate the displacement volume, has a displacement volume setting device 60, for example a variable inclination swashplate of an axial piston machine utilizing a bent-axis construction. The displacement volume setting device 60, includes, for the activation, the variable displacement device 24 that is in an operative connection with the displacement volume setting device 60. The variable displacement device 24 includes a positioning piston device 61 which is in an operative connection with the displacement volume setting device 60.

The hydraulic work pump 2 claimed by the invention is a unilaterally variable drive unit, in which the displacement volume setting device 60 can be varied starting from a position with a minimum displacement volume in a control direction or pivoting direction to a position with a maximum displacement volume. The positioning piston device 61 has a control pressure chamber 61$a$ that acts in the direction of the maximum displacement volume and a control pressure chamber 61$b$ that acts in the direction of the minimum displacement volume.

The displacement volume setting device 60 can be actuated by means of a control valve device 62, which is also a component of the variable displacement device 24. The control valve device 62 has a control valve, not illustrated in any further detail, with which the pressurization of the control pressure chambers 61$a$, 61$b$ of the positioning piston device 61 can be controlled with a control pressure or its depressurization to the tank 9.

The control valve device 62, to supply hydraulic fluid and to generate a control pressure in the control pressure chambers 61$a$ and 61$b$ of the positioning piston device 61, is in communication, by means of a control pressure line 63, with the charge pressure line 22 and thus the charging pressure circuit 23. The control valve device 62 is also in communication with a tank line 64 that leads to the tank 9.

Furthermore, a spring device 66 in the form of a compression spring is provided that actuates the displacement volume setting device 60 in the direction of the minimum displacement volume, which can be limited by means of a terminal stop, not illustrated in any further detail, of the displacement volume setting device 60.

To actuate the displacement volume setting device 60 in the direction of the position with maximum displacement volume during a starting process of the start-stop function of the shut-off internal combustion engine 3 by operating the hydraulic work pump 2 as a motor, in the illustrated exemplary embodiment a supplemental control piston device 80 is provided. The supplemental control piston device 80 is also in an operative connection with the displacement volume setting device 60 to adjust the displacement volume of the hydraulic work pump 2 and can be actuated directly by the pressure present in the hydraulic accumulator 30. The supplemental control piston device 80 is in the form of a unilaterally acting control piston and has a control pressure chamber that acts in the direction of the maximum displacement volume, which is in communication, by means of a hydraulic line 82, with the suction line 10 between the suction side S and the shutoff valve 50 and thus with the connecting line 45.

The hydraulic work system 5 includes a tank discharge path 100 that makes possible a connection of the delivery line 11 of the hydraulic work system 5 with the tank 9. The tank discharge path 100 is formed by a circulation pressure compensator 101. The circulation pressure compensator 101 is associated with the delivery line 11 of the hydraulic work system 5. The circulation pressure compensator 101 is in communication on the input side with the delivery line 11 of the hydraulic work system 5 and on the output side with the tank 9. For this purpose, the circulation pressure compensator 101 is located in a circulation line 105 that leads from the delivery line 11 of the hydraulic work system 5 to the tank 9. The circulation pressure compensator 101 is actuated by a spring 102 and by the maximum load pressure present in a load pressure line 103 of the actuated user of the hydraulic work system 5 into a closed position 101$a$ and into an open position 101$b$ by the pressure present in the delivery line 11 of the hydraulic work system 5. For this purpose, a control surface acting in the direction of the open position 101$b$ of the circulation pressure compensator 101 is in communication with a control line 106 which is in communication with the delivery line 11 of the hydraulic work system 5. The circulation pressure compensator 101 in the illustrated exemplary embodiment is in communication with the delivery line 11 of the hydraulic work system 5 downstream of the charge valve 32.

According to the invention, a bypass valve 110 is provided with which, when the hydraulic work pump 2 is operated as a motor to start the shut-off internal combustion engine 3, the volume flow delivered by the hydraulic work pump 2 operated as a motor on the delivery side P can be diverted directly to the tank 9.

When the hydraulic work pump 2 is operated as a motor to start the shut-off internal combustion engine 2 at the beginning of the starting process, the bypass valve 110 is actuated into an open position that connects the delivery side P of the hydraulic work pump 2 with the tank 9. During the starting process of the internal combustion engine 3, the bypass valve 110 is actuated into a closed position that shuts off the delivery side P of the hydraulic work pump 2 with the tank 9 before the idle speed of the internal combustion engine 3 is reached.

In the exemplary embodiments illustrated in FIGS. 1 and 2, the bypass valve 110 is a check valve 115 that closes in the flow direction to the tank 9. The check valve 115 has a valve body 116 that is actuated by a spring 117 into an open position that connects the delivery side P of the hydraulic work pump 2 with the tank 9. The valve body 116 is actuated by the quantity of hydraulic fluid flowing to the check valve 115 toward a shut-off position that shuts off the delivery side P of the hydraulic work pump 2 with tank 9.

The check valve 115 is therefore held in the open position by means of the set and specified spring force of the spring 117 for a predetermined quantity of hydraulic fluid. If the quantity of hydraulic fluid delivered by the hydraulic work pump 2 to the delivery side P exceeds this threshold set by the spring 117, the valve body 116 of the check valve 115 is actuated into the closed position by the quantity of hydraulic fluid delivered.

The check valve 115 is designed so that the valve body 116, during the starting process of the internal combustion engine 3, is actuated into the shut off position before the quantity of hydraulic fluid delivered by the hydraulic work pump 2 operated as a motor to the delivery side P at the minimum displacement volume of the hydraulic work pump 2 and the idle speed of the internal combustion engine 3 is reached.

To start the shut-off internal combustion engine 3, the control valve 40 is actuated into the open position 40b so that the hydraulic work pump 2 is driven via the connecting line 45 on the suction side S by hydraulic fluid from the hydraulic accumulator 30 and works as a motor. At the beginning of the starting process of the internal combustion engine 3, the delivery side P of the hydraulic work pump 2 is relieved via the open bypass valve 110 to the tank 9, so that during operation of the hydraulic work pump 2 as a motor, the quantity of hydraulic fluid delivered to the delivery side P of the hydraulic work pump 2 is diverted directly to the tank 9, bypassing the tank discharge path 100 of the hydraulic work system 5. If the threshold for the hydraulic fluid flow defined by the spring 117 is reached during the starting process, the bypass valve 110 is closed and the tank discharge path 100 takes over the quantity of hydraulic fluid supplied by the hydraulic work pump 2, to divert it to the tank 9 with the opened circulation pressure compensator 101.

As a result of the direct communication of the delivery side P of the hydraulic work pump 2 with the tank 9 via the bypass valve 110, at the beginning of the starting process of the shut-off internal combustion engine 3, by the operation of the hydraulic work pump 2 as a motor, the circulation pressure compensator 101 of the tank discharge path 100 of the hydraulic work system 5 and the valves optionally located upstream of the circulation pressure compensator 101 (charge valve 32 and optionally priority valve 12) do not need to be actuated into the open position by the hydraulic fluid flow supplied to the delivery side P of the hydraulic work pump 2, so that the pressure opposing the build-up of torque on the hydraulic work pump 2 operated as a motor on the delivery side P of the hydraulic work pump 2 is reduced and the hydraulic work pump 2 operating as a motor delivers a high torque to start the internal combustion engine 3.

In the exemplary embodiment illustrated in FIG. 1, the bypass valve 110 is associated with the delivery side P of the hydraulic work pump 2 upstream of the priority valve 12 and a bypass line 120 that leads to the tank 9, in which the bypass valve 110 is located, is in communication with the connecting line 14.

In the exemplary embodiment illustrated in FIG. 2, the bypass valve 110 is associated with the delivery side P of the hydraulic work pump 2 downstream of the priority valve 12 and the bypass line 120 leading to the tank 9, in which the bypass valve 110 is located, is in communication with the delivery line 11 of the hydraulic work system 5. The bypass line 120 is in communication upstream of the connection of the circulation pressure compensator 101 and upstream of the charge valve 32 to the delivery line 11 of the hydraulic work system 5.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed:

1. A hydrostatic drive system of a mobile machine, comprising:
   a hydraulic work system, and
   a hydraulic work pump that is driven by an internal combustion engine and, when operated as a pump, takes in hydraulic fluid with a suction side from a tank and, with a delivery side, delivers into a delivery line that leads to the hydraulic work system,
   wherein a hydraulic start-stop function is provided to start the internal combustion engine when shut-off in which the hydraulic work pump is operated as a motor,
   wherein, in a motor operation, the hydraulic work pump is driven by hydraulic fluid that is supplied from a hydraulic accumulator to the suction side of the hydraulic work pump,
   wherein a bypass valve is provided wherein, when the hydraulic work pump is operated as a motor to start the shut-off internal combustion engine, the bypass valve is configured to actuate into an open position that connects the delivery side of the hydraulic work pump with the tank to divert, to the tank, a volume flow delivered by the hydraulic work pump operated as a motor, and
   wherein, during the starting process of the internal combustion engine, the bypass valve is configured to actuate into a closed position in which the bypass valve shuts off the delivery side of the hydraulic work pump with the tank, before an idle speed of the internal combustion engine is reached.

2. The hydrostatic drive system according to claim 1, wherein, in the delivery line leading to the hydraulic work system, there is a priority valve for a priority supply of a consumer, the priority valve is connected, on an input side, with the delivery side of the hydraulic work pump via the delivery line leading to the hydraulic work system and, on an output side, with the delivery line leading to the hydraulic work system and a delivery line that leads to the consumer, and wherein the bypass valve is in communication, on the input side of the priority valve, with the delivery line leading to the hydraulic work system.

3. The hydrostatic drive system according to claim 1, wherein, in the delivery line leading to the hydraulic work system, there is a priority valve for a priority supply of a consumer, the priority valve is connected, on an input side, with the delivery side of the hydraulic work pump via the delivery line leading to the hydraulic work system and, on the output side, with the delivery line leading to the hydraulic work system and a delivery line leading to the consumer, and wherein the bypass valve is in communication, on the output side of the priority valve, with the delivery line leading to the hydraulic work system.

4. The hydrostatic drive system according to claim 1, wherein, in the delivery line leading to the hydraulic work system, there is a charge valve to charge the hydraulic accumulator, and wherein the bypass valve is in communication with the delivery line upstream of the charge valve.

5. The hydrostatic drive system according to claim 1, wherein, a circulation pressure compensator is in communication with the delivery line leading to the hydraulic work system, and wherein the bypass valve is in communication with the delivery line upstream of the circulation pressure compensator.

6. The hydrostatic drive system according to claim 1, wherein the bypass valve is actuated electrically and, for actuation, is in an operational connection with an electronic control device.

7. The hydrostatic drive system according to claim 1, wherein the bypass valve is a check valve that closes in a direction of flow to the tank, and is actuated by a spring into an open position that connects the delivery side of the hydraulic work pump with the tank.

8. The hydrostatic drive system according to claim 7, wherein the check valve has a valve body that is actuated into a closed position by a quantity of hydraulic fluid flowing to the check valve that shuts off the delivery side of the hydraulic work pump with the tank.

9. The hydrostatic drive system according to claim 7, wherein the check valve is configured so that a valve body of the check valve, during the starting process of the internal combustion engine, is actuated into the closed position before a quantity of hydraulic fluid supplied to the delivery side of the hydraulic work pump operated as a motor reaches a specified displacement volume of the hydraulic work pump and the idle speed of the internal combustion engine is reached.

10. The hydrostatic drive system according to claim 9, wherein the hydraulic work pump is a variable displacement pump with a variable displacement volume, and wherein the specified displacement volume equals a minimum displacement volume.

\* \* \* \* \*